United States Patent
Suyama et al.

(10) Patent No.: US 10,742,274 B2
(45) Date of Patent: Aug. 11, 2020

(54) RADIO COMMUNICATION DEVICE

(71) Applicant: NTT DOCOMO, INC., Tokyo (JP)

(72) Inventors: Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/074,477

(22) PCT Filed: Feb. 2, 2017

(86) PCT No.: PCT/JP2017/003868
§ 371 (c)(1),
(2) Date: Aug. 1, 2018

(87) PCT Pub. No.: WO2017/135389
PCT Pub. Date: Aug. 10, 2017

(65) Prior Publication Data
US 2019/0028153 A1    Jan. 24, 2019

(30) Foreign Application Priority Data

Feb. 5, 2016   (JP) ................................. 2016-021356

(51) Int. Cl.
| | |
|---|---|
| H04B 7/0426 | (2017.01) |
| H04B 7/0413 | (2017.01) |
| H04B 7/06 | (2006.01) |
| H01Q 3/26 | (2006.01) |
| H04B 7/10 | (2017.01) |
| H01Q 3/30 | (2006.01) |

(Continued)

(52) U.S. Cl.
CPC ............ H04B 7/043 (2013.01); H01Q 3/267 (2013.01); H01Q 3/2652 (2013.01); H04B 7/0413 (2013.01); H04B 7/0617 (2013.01); H04B 7/10 (2013.01); H01Q 3/30 (2013.01); H01Q 21/061 (2013.01); H04W 16/28 (2013.01)

(58) Field of Classification Search
CPC . H04B 7/043; H04B 7/10; H04B 7/04; H01Q 21/061; H01Q 3/2652; H01Q 3/26
USPC .................................. 375/262, 267; 370/277
See application file for complete search history.

(56) References Cited

U.S. PATENT DOCUMENTS

| | | | |
|---|---|---|---|
| 9,042,276 B1* | 5/2015 | Harel ..................... | H04J 3/1694 370/277 |
| 2013/0057432 A1* | 3/2013 | Rajagopal ............... | H01Q 3/26 342/368 |
| 2014/0073337 A1 | 3/2014 | Hong et al. | |

(Continued)

FOREIGN PATENT DOCUMENTS

| | | |
|---|---|---|
| JP | 2013-232741 A | 11/2013 |
| WO | 2016/078565 A1 | 5/2016 |

OTHER PUBLICATIONS

International Search Report issued in PCT/JP2017/003868 dated Apr. 25, 2017 (2 pages).

(Continued)

*Primary Examiner* — Fitwi Y Hailegiorgis
(74) *Attorney, Agent, or Firm* — Osha Liang LLP

(57) ABSTRACT

A radio communication device includes: a full-digital array that has a first antenna element group including multiple antenna elements and that has no analog variable phase shifter; and a hybrid beamformer that has a second antenna element group including multiple antenna elements and that has an analog variable phase shifter.

9 Claims, 11 Drawing Sheets

(51) Int. Cl.
*H01Q 21/06* (2006.01)
*H04W 16/28* (2009.01)

(56) References Cited

U.S. PATENT DOCUMENTS

2015/0195026 A1   7/2015  Sagong et al.
2016/0142922 A1*  5/2016  Chen .................. H04B 7/0695
                                                      375/267

OTHER PUBLICATIONS

Extended European Search Report in counterpart European Application No. 17747540.7 dated Jul. 25, 2019 (9 pages).
F. Sohrabi et al; "Hybrid Digital and Analog Beamforming Design for Large-Scale Antenna Arrays"; ARXIV.org, Cornell University; Ithaca, New York; Jan. 25, 2016 (13 pages).

* cited by examiner

RADIO COMMUNICATION DEVICE

TECHNICAL FIELD

The present invention relates to a radio communication device.

BACKGROUND ART

Recently, in the field of radio communication, the MIMO (Multiple-Input and Multiple-Output) technique has been utilized, which realizes an improvement in the speed and quality of signal transmission by executing transmission and reception using multiple antennas on each of the radio transmission device side and on the radio reception device side. In order to further improve signal transmission speed and further reduce interference, a massive-MIMO transmission scheme has been considered which uses a large number of antenna elements (e.g., 100 elements or more) in a high frequency band (e.g., 10 GHz or more) that enables antenna miniaturization and in which a wide bandwidth can be secured (e.g., Patent Document 1). FIG. 1 schematically shows ordinary MIMO and massive-MIMO.

With massive-MIMO, advanced beamforming (BF) can be implemented that uses a greater number of antenna elements in comparison to conventional MIMO. Beamforming is a technology that involves controlling the directivity and/or shape of a beam (e.g., a transmission beam corresponding to a transmission antenna, or a reception beam corresponding to a reception antenna) by controlling, for multiple antennas, the phase and amplitude of the respective signals. FIG. 2 schematically shows a beam to which beamforming is not applied, and FIG. 3 schematically shows a beam to which beamforming is applied.

With MIMO, the phase and amplitude can be controlled for each antenna element, and therefore, the flexibility of beam control increases with an increase in the number of antenna elements that are used, allowing advanced control.

With massive-MIMO, beamforming of different modes are assumed. The following exemplifies an overview of each of analog beamforming (ABF), digital beamforming (DBF), digital precoding (DP) full-digital massive-MIMO, and hybrid beamforming (HBF).

With analog beamforming, beams are formed using a variable phase shifter, which is analog circuitry. This analog circuitry operates at a radio frequency (RF) or an intermediate frequency (IF). Beams formed by analog beamforming are common for all frequency bands. These beams are generally directed to the direction of arrival of a radio signal. With analog beamforming, there is a possibility for a characteristic deterioration to occur as a result of inter-beam interference. On the other hand, analog beamforming can be implemented with a simpler circuit configuration compared to digital beamforming since it is possible to reduce the numbers of up-converters, down-converters and baseband processing circuits.

Digital beamforming is beamforming technique for executing beamforming by a digital signal processing, and beams are formed not by a variable phase shifter but by baseband processing circuitry. Beams formed by digital beamforming are common for all frequency bands. With digital beamforming, there is a possibility that inter-beam interference can be reduced by performing digital signal processing. On the other hand, the circuit configuration is more complex with digital beamforming since it is not possible for the numbers of up-converters, down-converters and baseband processing circuits to be reduced.

With digital precoding full-digital massive-MIMO (full-digital array), it is possible to optimize channels by forming beams separately for different frequencies. With digital precoding full-digital massive-MIMO, there is a possibility that inter-beam interference can be reduced by performing digital signal processing. In controlling digital precoding full-digital massive-MIMO, channel state information (CSI) for each frequency is required. The circuit size of digital precoding full-digital massive-MIMO is the same as that of digital beamforming.

Hybrid beamforming is a combination of analog beamforming and digital precoding. With hybrid beamforming, analog beamforming is used to form beams. Therefore, it is possible to reduce circuit size. The inter-beam interference that occurs as a result of analog beamforming can be reduced by using digital precoding. With hybrid beamforming, similar characteristics as those of digital precoding may be realized by optimizing the numbers of up-converters, down-converters and baseband processing circuits. FIG. 4 and FIG. 5 show example configurations of hybrid beamformers used for hybrid beamforming. FIG. 4 shows a full-array type configuration, and FIG. 5 shows a sub-array type configuration. In either configuration, the number of chains for RF circuits and baseband processing circuits is L, and the number of transmission antenna elements is $N_T$.

RELATED ART DOCUMENT

Patent Document

Patent Document 1: Japanese Patent Application Laid-Open Publication No. 2013-232741

SUMMARY OF THE INVENTION

Problem to be Solved by the Invention

In a hybrid beamformer, radio performance changes depending on how the L number (e.g., 32) of converters (up-converters and down-converters) and the $N_T$ number (e.g., 256) of antenna elements are connected. Changing this connection depends on the characteristic of the propagating channels, and it is generally difficult to perform.

With the above circumstances taken into consideration, an object of the present invention is to provide a radio communication device of which the circuitry section and antenna elements are appropriately configured.

Means of Solving the Problems

The radio communication device of the present invention includes: a full-digital array that has a first antenna element group including multiple antenna elements and that has no analog variable phase shifter; and a hybrid beamformer that has a second antenna element group including multiple antenna elements and that has an analog variable phase shifter.

Effect of the Invention

According to the present invention, a radio communication device is provided in which the circuitry section and antenna elements are appropriately configured.

MODES FOR CARRYING OUT THE INVENTION

1. Embodiment

1(1). Massive-MIMO Transmission

A massive-MIMO transmission scheme according to embodiments of the present invention will be described. In massive-MIMO, in which a large number of antenna elements $A_T$ are used to perform radio communication, a high radio communication speed (a high data rate) is achieved by multiplexing data streams. Moreover, more advanced beamforming compared with conventional beamforming is achieved because, as a result of a large number of antenna elements $A_T$ being used, the antenna control flexibility is improved in performing beamforming. Accordingly, reduction in interference and/or efficient usage of radio resources are achieved.

The number of antenna elements $A_T$ provided for a base station supporting massive-MIMO is freely selected. The number of antenna elements $A_T$ may preferably be 32 or more, 64 or more, 96 or more, 100 or more, 128 or more, 192 or more, 200 or more, 256 or more, 500 or more, 512 or more, 1000 or more, or 1024 or more.

With a massive-MIMO transmission scheme, a high frequency band may preferably be used (e.g., a frequency band at 10 GHz or higher). In a high frequency band, compared with a low frequency band, radio resources with a wide bandwidth (e.g., 200 MHz or wider) can be more easily secured. Moreover, since the size of a transmission antenna is proportional to the wavelength of a signal, in a case in which a high frequency band, in which radio signals have a relatively short wavelength, is used, the size of an antenna device (array antenna) can be further reduced. Since propagation loss increases as frequency becomes higher, even when the same transmission power is used by a base station to transmit a radio signal, the received signal strength at a mobile station will be lower in a case in which a high frequency band is used, compared with a case in which a low frequency band is used.

Figure 1:
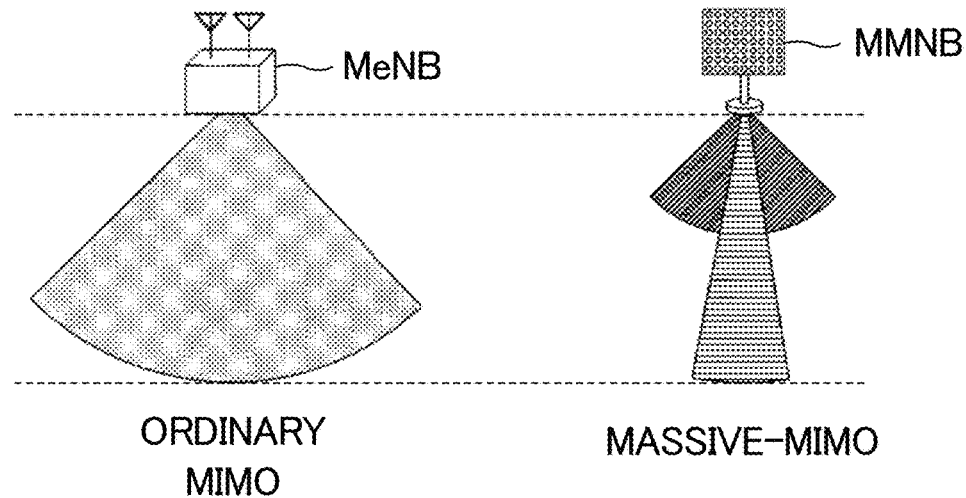
FIG. 1 is a schematic diagram illustrating a massive-MIMO transmission scheme.
Figure 2:
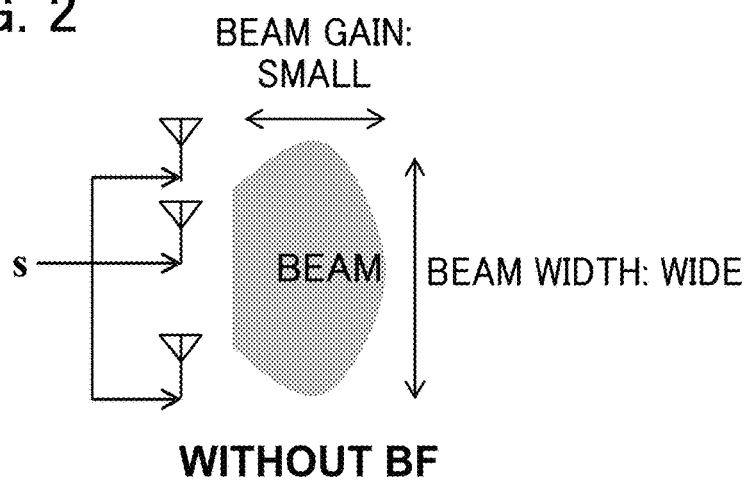
FIG. 2 is a schematic diagram illustrating a beam to which no beamforming is applied.
Figure 3:
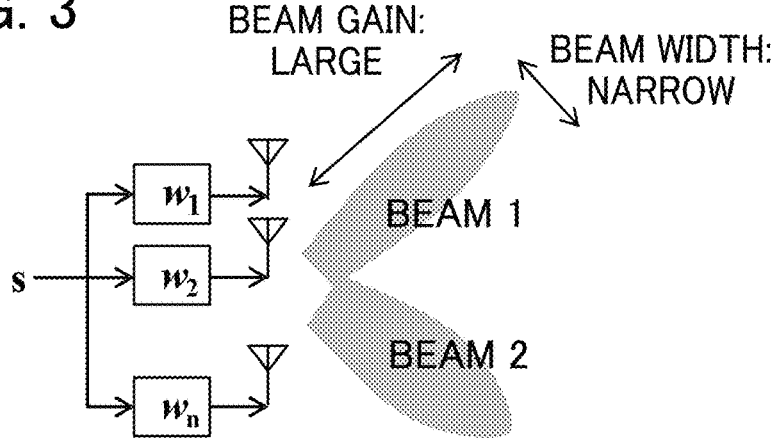
FIG. 3 is a schematic diagram illustrating a beam to which beamforming is applied.
Figure 4:
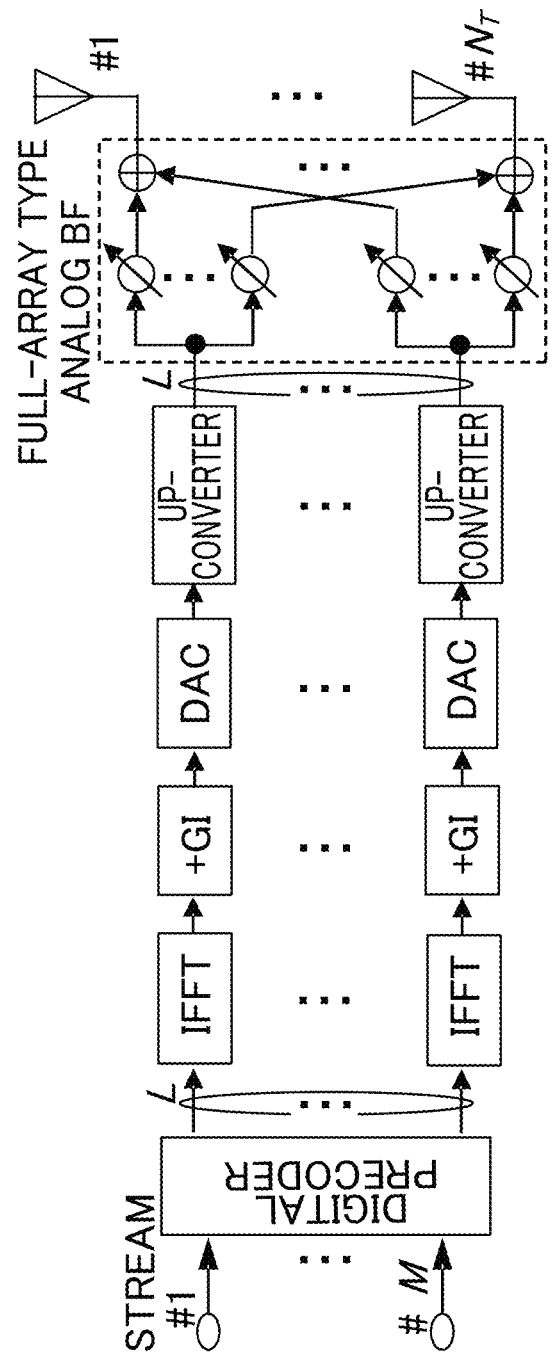
FIG. 4 is a configuration diagram illustrating a full-array type hybrid beamformer.
Figure 5:
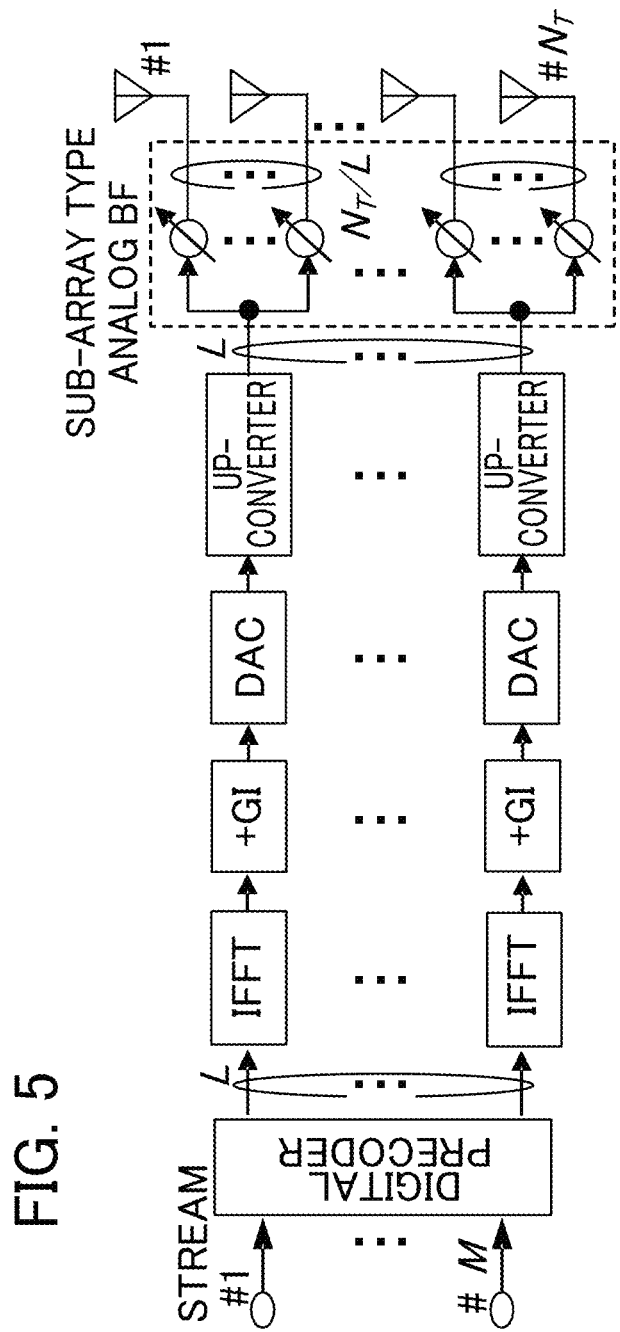
FIG. 5 is a configuration diagram illustrating a sub-array type hybrid beamformer.

However, this reduction in the received signal strength caused by the use of a high frequency band can be compensated by a beamforming gain. FIG. 1 is a diagram schematically illustrating reachable ranges of beams (radio signals) varying depending on frequencies. A conventional base station (a macro base station MeNB) uses a low frequency band to perform radio communication, and accordingly, beams reach further even when beams with wide radiation patterns are used.

In addition, a base station (a small base station MMNB) that supports a massive-MIMO transmission scheme of the present embodiment uses a high frequency band to perform radio communication, resulting in a short beam reaching distance compared to a macro base station MeNB when a beam having a wide radiation pattern is used. However, when the width of a beam radiation pattern is reduced by means of beamforming, it is possible to increase a distance reached by a beam even in the case of a small base station MMNB in which a high-frequency band is used.

Figure 6:
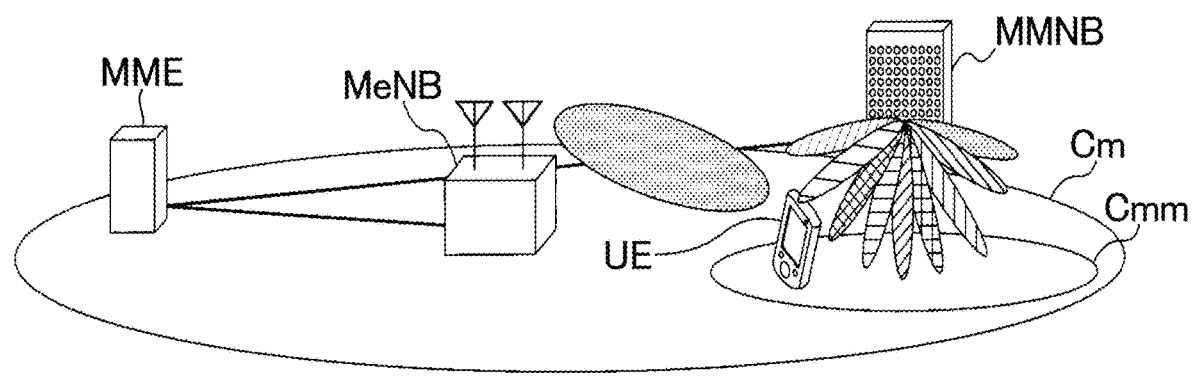
FIG. 6 is a schematic configuration diagram illustrating a radio communication system according to an embodiment.

FIG. 6 is a schematic configuration diagram of radio communication system 1 according to an embodiment. Radio communication system 1 includes a macro base station MeNB, a small base station MMNB, a central control station MME, and a user device UE. The small base station MMNB is a base station that supports a massive-MIMO transmission scheme.

The macro base station MeNB forms a macro cell Cm around itself, and the small base station MMNB forms a massive-MIMO cell (MM cell) Cmm around itself. The cell size of the MM cell Cmm is smaller than that of the macro cell Cm since the frequency band used by the small base station MMNB (e.g., 10 GHz band) has a higher frequency and larger propagation loss than the frequency band used by the macro base station MeNB (e.g., 2 GHz band). Accordingly, a propagation path between the small base station MMNB and the user device UE is likely to be connected via a line-of-sight propagation.

As FIG. 6 shows, it is possible for the MM cell Cmm to overlap a radio-communicable area by use of another radio access technology (RAT), such as the macro cell Cm. As a result, with respect to a user device UE that is located in the overlapping area, multiple connectivity, which is achieved by use of multiple radio access technologies, is supported.

Furthermore, it is possible for a macro base station MeNB that supports different radio access technologies to transmit a control signal to a user device UE that is currently in communication with a small base station MMNB supporting the massive-MIMO transmission scheme. Examples of other radio access technologies include a public or local radio LAN.

As previously mentioned, with massive-MIMO transmission using a high frequency band, it is preferable that a propagation loss be compensated by way of a gain achieved by beamforming. Furthermore, it is preferable that multiple data streams be spatially multiplexed and transmitted in order for faster radio communication to be achieved. With such multiplexed transmission, it is even more preferable that beams be controlled by applying thereto beamforming and inter-stream multiplex be compensated by applying thereto precoding.

1(2). Digitization of Some Sub-Arrays

As mentioned previously, by use of a hybrid beamformer, both a reduction of circuitry size by analog beamforming and a reduction of inter-beam interference by digital precoding can be achieved at the same time. In contrast, by use of a full-digital array, although the circuitry size increases, more precise digital control can be achieved. Accordingly, it is preferable that the advantages of both a hybrid beamformer and a full-digital array be achieved at the same time.

Figure 7:
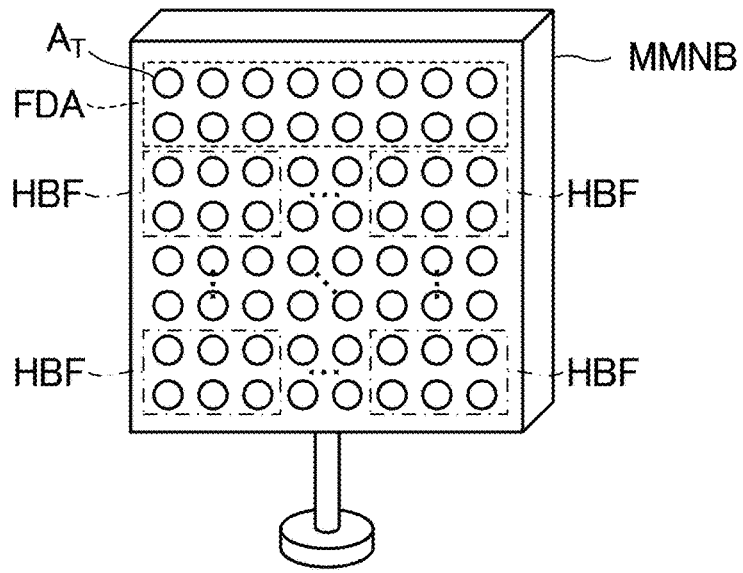
FIG. 7 is a diagram indicating an example of the categorization of antenna elements of a small base station.

According to the present embodiment, as FIG. 7 shows, with respect to a small base station MMNB, some number (Q) of antenna elements $A_T$ (a first antenna element group) of an array antenna are used for a full-digital array FDA, the array antenna having $N_T$ antenna elements $A_T$, and the remaining number ($N_T$–Q) of the antenna elements $A_T$ (a second antenna element group) are being used for a hybrid beamformer HBF.

The full-digital array FDA includes the first antenna element group (from the first antenna element $A_T$ to the Qth antenna element $A_T$). The full-digital array FDA does not include an analog variable phase shifter since it digitally adjusts the phase and amplitude of signals. On the other hand, the hybrid beamformer HBF includes the second antenna element group (from ($N_T$–Q) th antenna element AT to the $N_T$th antenna element $A_T$) and an analog variable phase shifter.

It is preferable that the hybrid beamformer HBF include multiple sub-arrays. The multiple sub-arrays each perform analog beamforming. It is preferable that each of the antenna elements AT included in the second antenna element group belong to any one of the multiple sub-arrays. In the below-described configuration, the hybrid beamformer HBF includes multiple sub-arrays.

Figure 8:
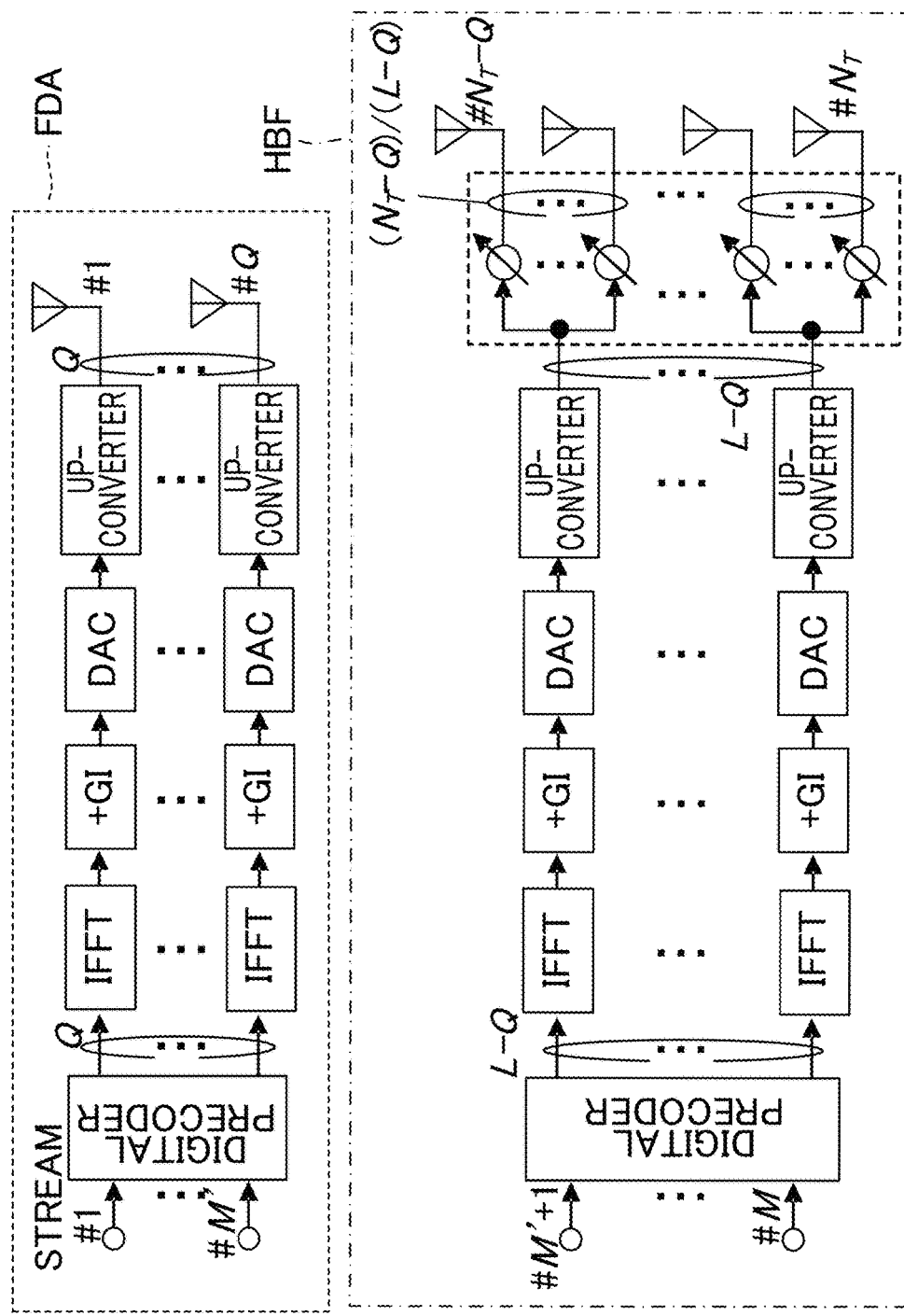
FIG. 8 is a configuration diagram illustrating a small base station wherein a full-digital array operates as a digital precoder.

1(2)-1. Configuration in Which a Full-Digital Array Operates as a Digital Precoder FIG. 8 shows a configuration diagram of a small base station MMNB in a case in which a full-digital array FDA operates as a digital precoder. A small base station MMNB includes a full-digital array FDA and a hybrid beamformer HBF.

A full-digital array FDA includes one digital precoder, Q number of inverse-Fourier transformers (IFFT), Q number of guard interval imparters (+GI), Q number of digital-to-analog converters (DAC), Q number of up-converters, and Q number of antenna elements $A_T$ (a first antenna element group). The full-digital array FDA transmits from the first antenna element group a signal (a first signal) that has been subjected to full-digital beamforming. Since a full-digital array FDA operates as a digital precoder, it is possible to perform Q-dimensional digital precoding (the number of dimensions equal to the number of antenna elements AT) for each frequency. A hybrid beamformer HBF includes one digital precoder, (L–Q) number of inverse-Fourier converters, (L–Q) number of guard interval imparters, (L–Q) number of DA converters, (L–Q) number of up-converters, (L–Q) number of sub-arrays, and ($N_T$–Q) number of antenna elements $A_T$ (second antenna element group). Each sub-array includes (($N_T$–Q)/(L–Q)) number of antenna elements $A_T$. The hybrid beamformer HBF transmits from the second antenna element group a signal (a second signal) that has been subjected to hybrid beamforming, hybrid beamforming being a combination of digital precoding and analog beamforming.

In this configuration, a total L number of inverse-Fourier converters are necessary for full-digital array FDAs and a hybrid beamformers. This number is the same as the number of inverse-Fourier converters in an ordinary hybrid beamformer.

Figure 9:
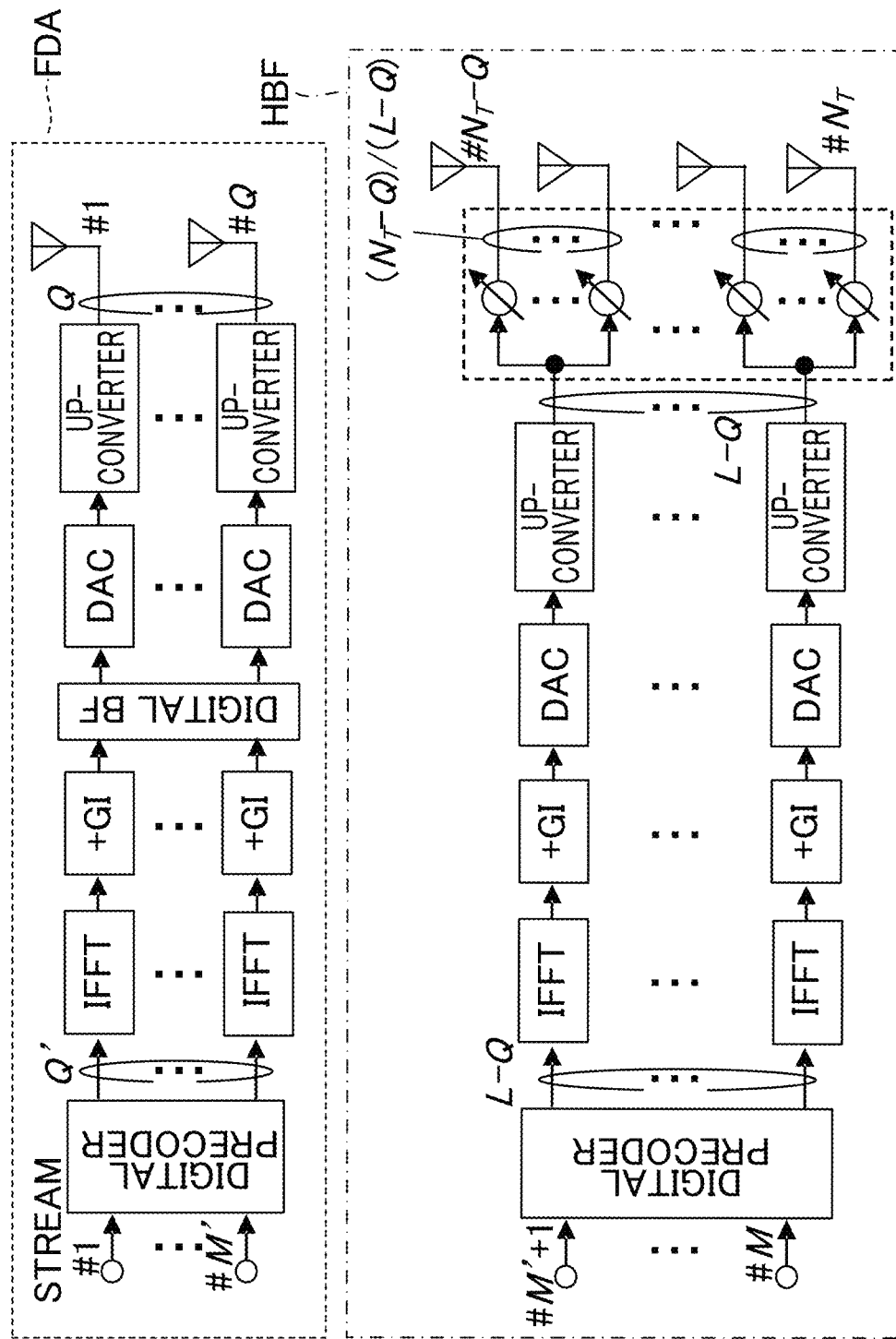
FIG. 9 is a configuration diagram illustrating a small base station wherein a full-digital array operates as a digital precoder and a digital beamformer.

1(2)-2. Configuration in Which a Full-Digital Array Operates as a Digital Precoder and a Digital Beamformer FIG. 9 shows a configuration diagram of a small base station MMNB in a case in which a full-digital array FDA operates as a digital precoder and a digital beamformer. As previously mentioned, the small base station MMNB includes a full-digital array FDA and a hybrid beamformer HBF.

A full-digital array FDA includes one digital precoder, Q' (<Q) number of inverse-Fourier converters, Q' number of guard interval imparters, one digital beamformer, Q number of DA converters, Q number of up-converters, and Q number of antenna elements $A_T$ (a first antenna element group). The full-digital array FDA transmits from the first antenna element group a signal that has been subjected to full-digital beamforming. In the present configuration, it is possible to perform Q-dimensional digital precoding (the number of dimensions being smaller than the number of antenna elements $A_T$) for each frequency. After digital precoding is performed, digital beamforming is performed. A configuration may be adopted in which digital beamforming is included in digital precoding and the two processes are collectively performed.

The configuration of a hybrid beamformer HBF is substantially the same as the one described in the previous item, 1(2)-1. The number of inverse-Fourier converters that a full-digital array FDA includes is Q', and since the number of inverse-Fourier converters that a hybrid beamformer HBF includes is (L–Q), the number of inverse-Fourier converters is (L–Q+Q') in total.

1(3). Configuration in Which Arrival Direction Estimation is Performed

Figure 10:
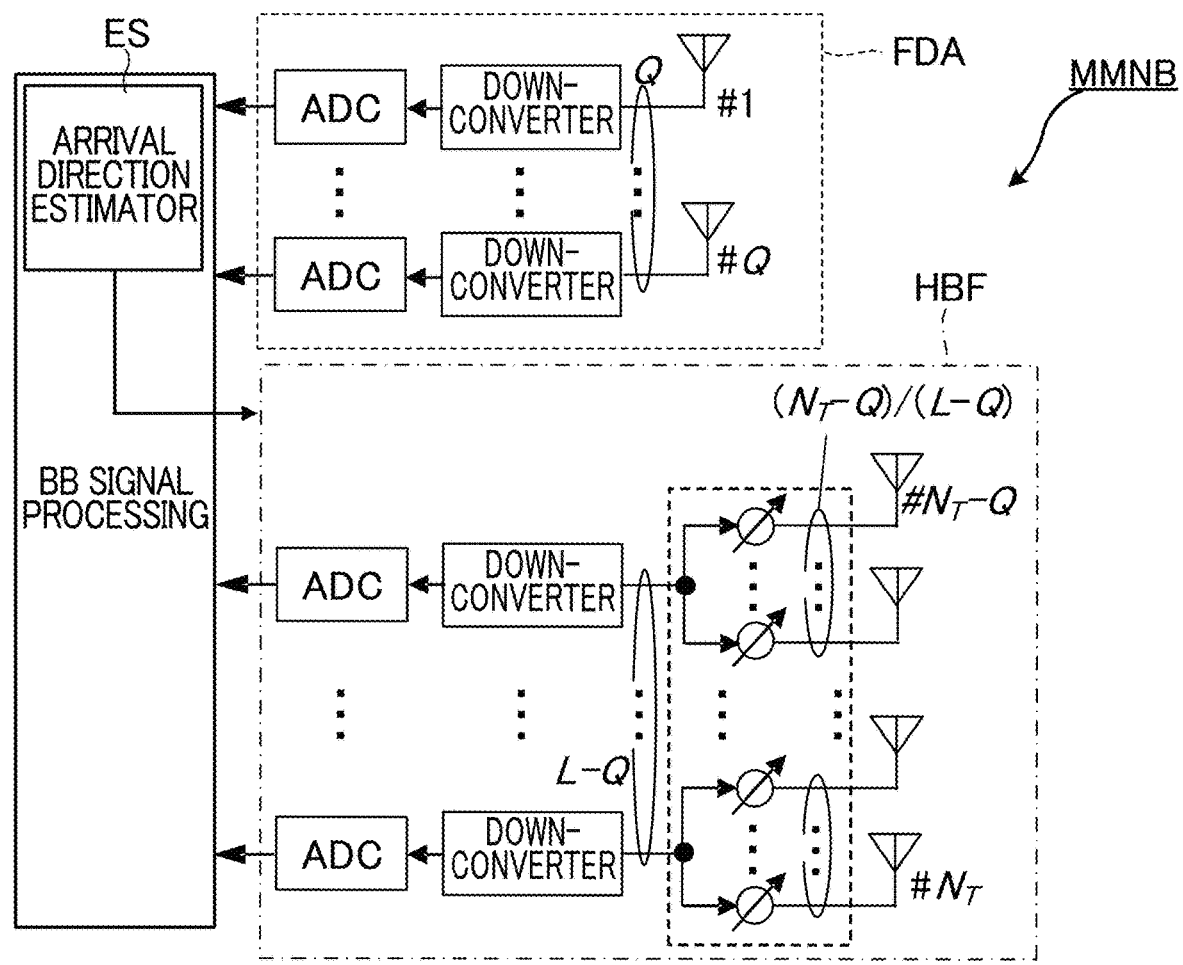
FIG. 10 is a configuration diagram illustrating a small base station performing arrival direction estimation.

FIG. 10 is a configuration diagram of a small base station MMNB that performs arrival direction estimation based on an uplink radio signal received by the full-digital array. The first antenna element group (Q number of antenna elements $A_T$) that a full-digital array FDA is equipped with receives an uplink radio signal. The received radio signal is supplied to a base band signal processor (BB Signal Processor) via a down-converter and an AD converter. An arrival direction estimator ES of the base band signal processor estimates the arrival direction of the radio signal based on the received radio signal. The method that the arrival direction estimator ES uses to estimate the arrival direction may be freely selected. Examples of methods to be used to estimate the arrival direction include Minimum Variance Distortionless Response (MVDR), Multiple Signal Classification (MUSIC), or Estimation of Signal Parameter via Rotational Invariance Technique (ESPRIT).

The hybrid beamformer HBF receives an uplink radio signal by performing analog beamforming towards the arrival direction estimated by the arrival direction estimator ES. That is, according to this configuration, it is possible to narrow the beam-search range (or preferably, to omit beam searching) of analog beamforming performed since arrival direction of a radio signal received by the hybrid beamformer HBF is estimated.

With respect to this configuration, it is preferable that the arrangement of the first antenna element group of the full-digital array FDA be set to one that enables the realization of a necessary level of precision in arrival direction estimation. For example, it is preferable that the first antenna element group be arranged in a rectangular area of which horizontal length is longer than its vertical length for the purpose of increasing azimuth direction estimation precision.

Figure 11:
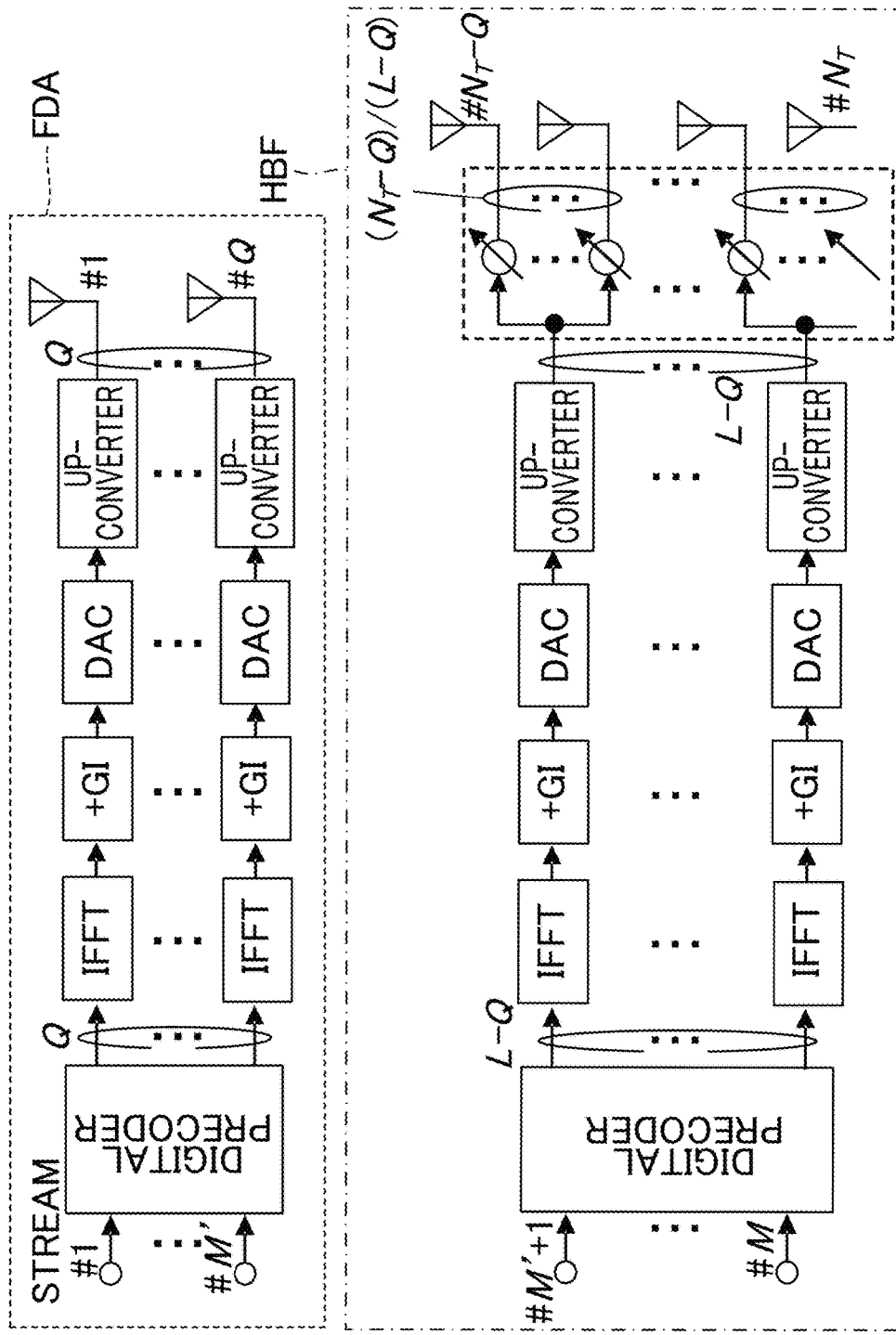
FIG. 11 is a configuration diagram illustrating a small base station that adaptively allocates a full-digital array and a hybrid beamformer.

1(4). Configuration in Which a Full-Digital Array and a Hybrid Beamformer are Adaptively Allocated FIG. 11 is a configuration diagram of a small base station MMNB that adaptively allocates a full-digital array FDA and a hybrid beamformer HBF.

The greater the number Q of antenna elements $A_T$ included in the first antenna element group is, the greater the effect of digital precoding performed by the full-digital array FDA. Accordingly, it is preferable that the full-digital array FDA transmit a stream that must be transmitted with a higher reliability than a predetermined threshold, from among the streams (from #1 to #M) that must be transmitted by the small base station MMNB.

Furthermore, another preferable configuration is one in which, for the purpose of increasing the reliability of radio transmission, the full-digital array FDA and the hybrid beamformer HBF share a digital precoder that performs digital precoding.

1(5). Configuration in Which a Full-Digital Array Performs Calibration

With respect to a configuration in which a small base station MMNB transmits and receives signals with Time Division Duplex (TDD), the configuration of circuitry for transmission and that for reception differ. It is possible to take advantage of the channel reciprocity at the time of transmitting or receiving signals since RF calibration compensates such difference It is difficult for a hybrid beamformer HBF alone to perform calibration because it is influenced by analog beamforming. Therefore, by combining a hybrid beamformer HBF and a full-digital array FDA, it will be possible to perform calibration easily.

Figure 12:
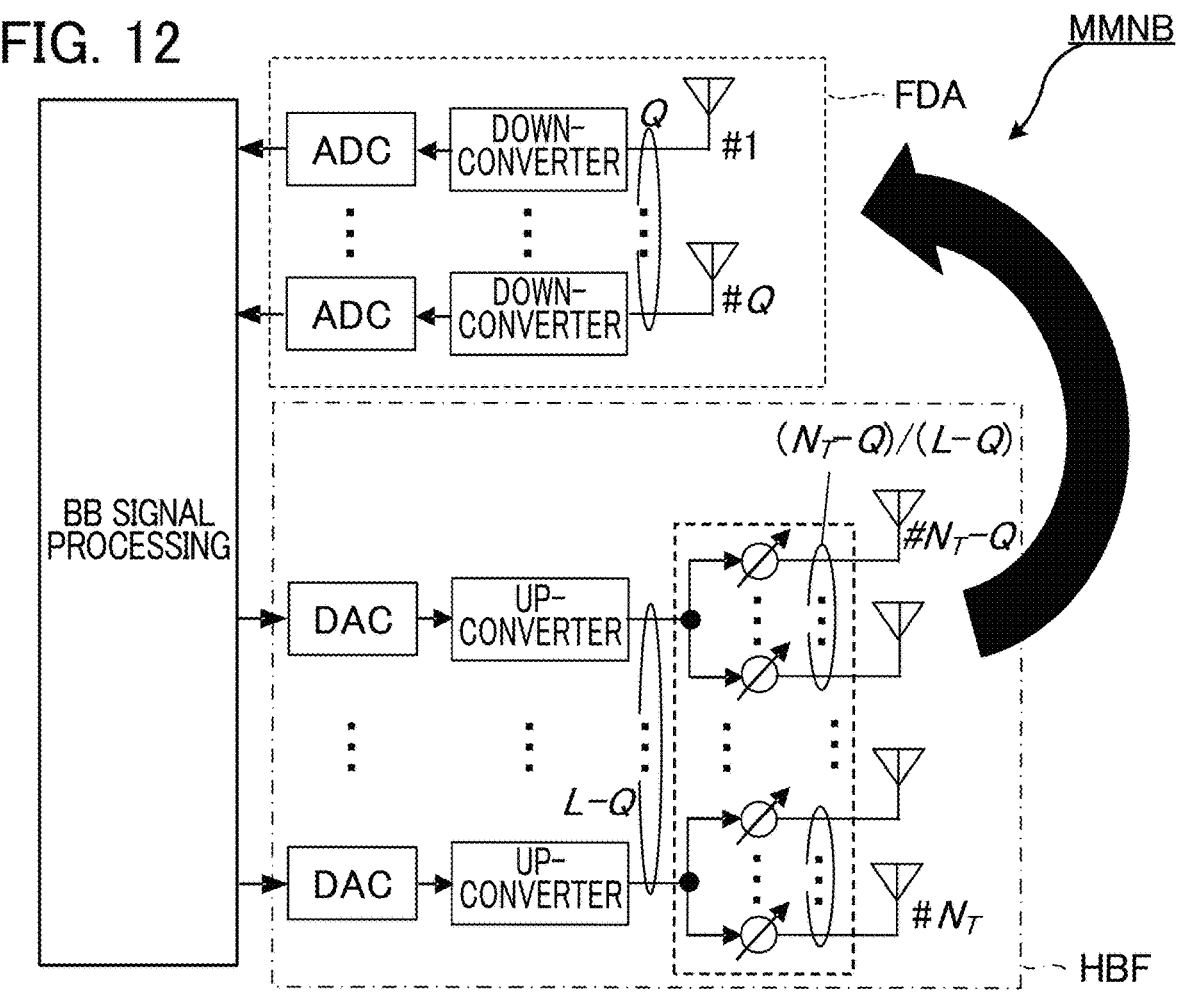
FIG. 12 is a diagram illustrating calibration of a full-digital array.
Figure 13:
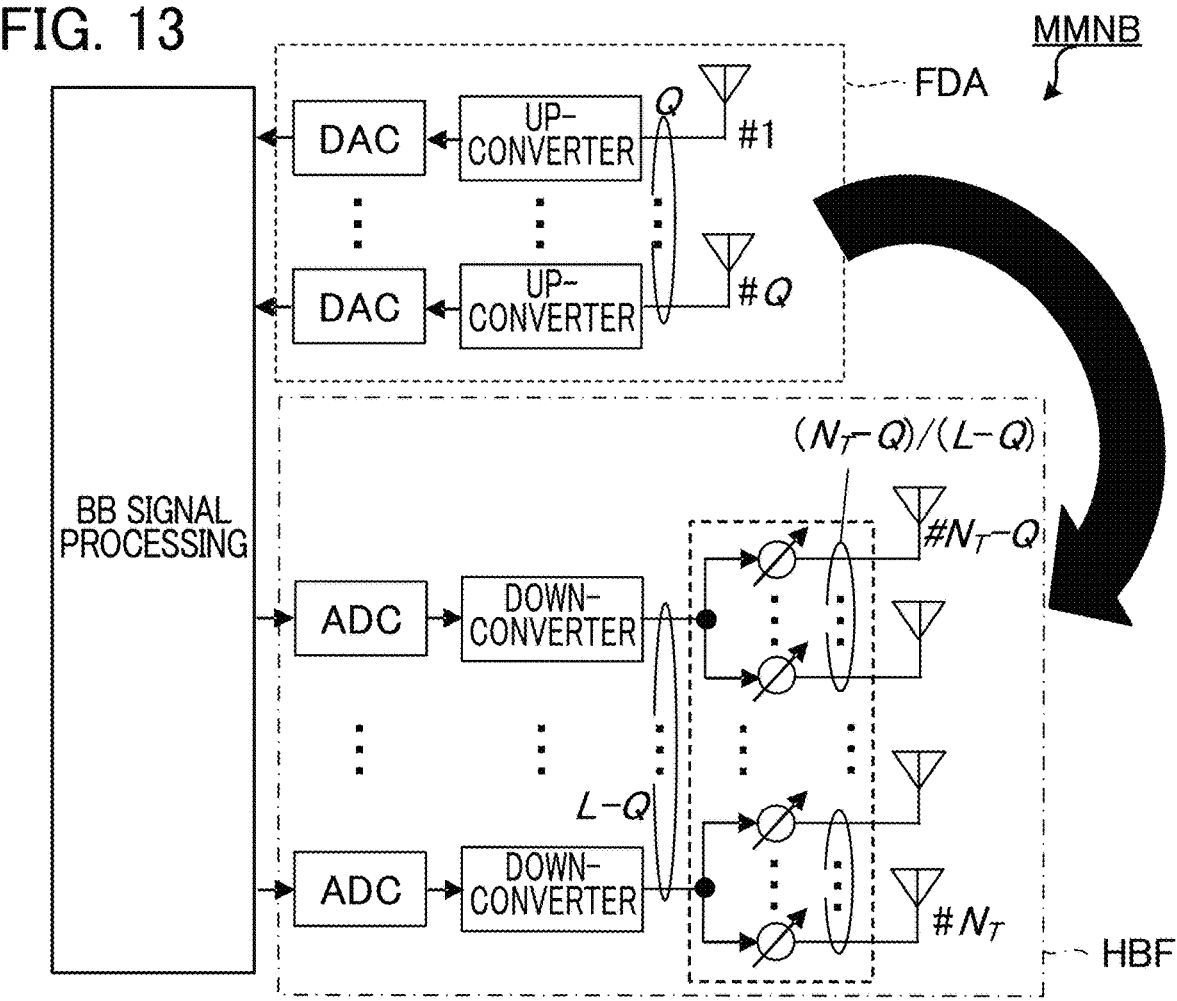
FIG. 13 is a diagram illustrating calibration of a hybrid beamformer.

More specifically, as FIG. 12 shows, first the full-digital array FDA performs calibration based on a second calibration signal transmitted from the second antenna element group of the hybrid beamformer HBF. Then, as FIG. 13 shows, the hybrid beamformer HBF performs calibration based on a first calibration signal transmitted from the first antenna element group of the full-digital array FDA.

1(6). Hardware Configuration

Figure 14:
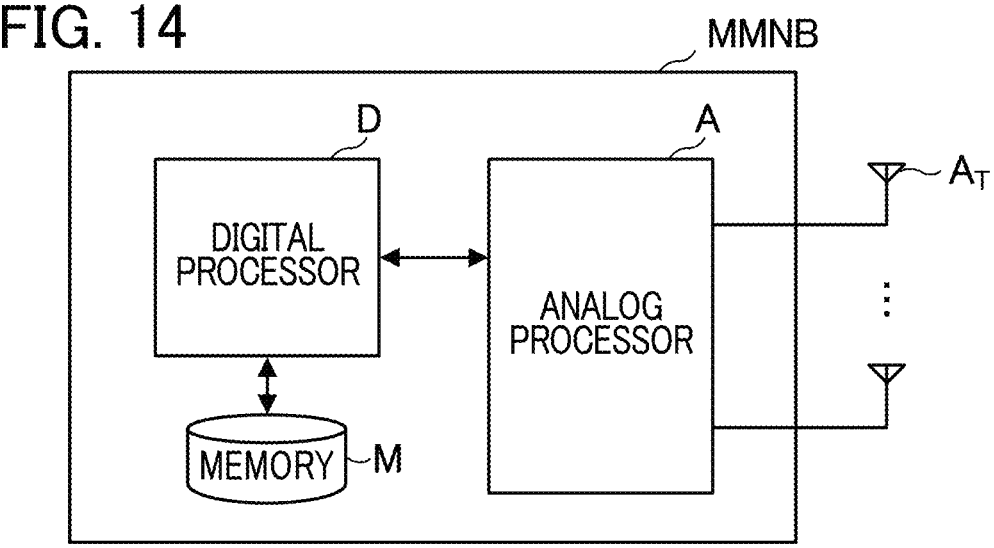
FIG. 14 is a hardware configuration diagram of a small base station.

FIG. 14 shows a hardware configuration of a small base station MMNB. A small base station MMNB includes a digital processor D, a memory M, an analog processor A, and antenna elements $A_T$. The digital processor D is an element that performs various digital signal processes, and it provides functional elements (functional blocks) such as the previously mentioned digital precoder, inverse-Fourier converter, guard interval imparter, digital beamformer, base band signal processor, and arrival direction estimator ES. The digital processor D is, for example, a Central Processing Unit (CPU), and it provides these functional elements by executing a computer program stored in the memory M. The memory M may include a RAM and a ROM. The analog processor A is an element that performs various analog signal processes, and includes, for example, the previously mentioned up-converter, down-converter, amplifier and variable phase shifter.

The previously mentioned DA converter and AD converter, which convert signals from digital signals to analog signals and vice versa, may also be included in the analog processor A.

1(7). Effects of the Present Embodiment

According to the configuration of the present embodiment, i.e., a configuration including both a full-digital array FDA and a hybrid beamformer HBF, a small base station MMNB is provided in which the circuitry section and the antenna elements are appropriately configured.

2. Modifications

The abovementioned embodiments may be modified in various ways.

The following exemplifies specific modifications. Two or more embodiments freely selected from the previously mentioned embodiments and the following examples may be combined as appropriate, as long as they do not conflict with one another.

2(1). Modification 1

In the previously mentioned embodiments, the small base station MMNB includes both a full-digital array FDA and a hybrid beamformer HBF. In another aspect, the user device UE may include both a full-digital array FDA and a hybrid beamformer HBF. In other words, the previously mentioned configuration in which a full-digital array FDA and a hybrid beamformer HBF are included may be applied to any radio communication device.

The same applies to the hardware configuration, i.e., the small base station MMNB may include a digital processor D, a memory M, an analog processor A, and antenna elements $A_T$, or alternatively, the user device UE may include the digital processor D, the memory M, the analog processor A, and the antenna elements $A_T$.

2(2). Modification 2

A hybrid beamformer HBF may include multiple sub-arrays, as in the previously mentioned embodiments, or alternatively, it may include a single full-array.

2(3). Modification 3

A user device UE is any device that is capable of communicating via radio with base stations in a network (macro base station MeNB, and small base station MMNB). A user device UE may be any of the following examples: a mobile phone terminal such as a feature phone or a smart phone, a tablet terminal, a desktop personal computer, a laptop personal computer, an Ultra-Mobile Personal Computer (UMPC), a portable game machine, or other radio terminals.

DESCRIPTION OF REFERENCE SIGNS

A . . . analog processor; $A_T$ . . . antenna elements; Cm . . . macro cell; Cmm massive-MIMO cell; D . . . digital processor; ES . . . arrival direction estimator; FDA . . . full-digital array; HBF . . . hybrid beamformer; M . . .

memory; MME . . . central controller; MMNB . . . small base station; MeNB . . . macro base station; UE . . . user device.

The invention claimed is:

1. A radio communication device comprising:
a full-digital array that comprises a first antenna element group including multiple antenna elements and that comprises no analog variable phase shifter; and
a hybrid beamformer that comprises a second antenna element group including multiple antenna elements and that comprises an analog variable phase shifter,
wherein the full-digital array transmits a first signal that has been subjected to full-digital beamforming,
wherein the hybrid beamformer transmits a second signal that has been subjected to hybrid beamforming, the hybrid beamforming being a combination of digital precoding and analog beamforming, and
wherein the full-digital array, with respect to the full-digital beamforming, performs digital precoding for which a number of dimensions is equal to a number of antenna elements included in the first antenna element group.

2. The radio communication device according to claim 1, wherein the full-digital array, with respect to the full-digital beamforming, performs digital precoding for which the number of dimensions is less than the number of antenna elements included in the first antenna element group, and then the full-digital array performs digital beamforming.

3. The radio communication device according to claim 2, wherein the first antenna element group is arranged in a rectangular area for which a horizontal length is longer than a vertical length.

4. The radio communication device according to claim 1, wherein the first antenna element group is arranged in a rectangular area for which a horizontal length is longer than a vertical length.

5. The radio communication device according to claim 1, wherein each of the antenna elements included in the second antenna element group belongs to any one of multiple sub-arrays.

6. The radio communication device according to claim 1, wherein the full-digital array and the hybrid beamformer share a digital precoder that performs digital precoding.

7. The radio communication device according to claim 1, further comprising an arrival direction estimator that estimates, based on a radio signal received by the first antenna element group, the arrival direction of the radio signal,
wherein the hybrid beamformer receives the radio signal by performing analog beamforming towards the arrival direction estimated by the arrival direction estimator.

8. The radio communication device according to claim 1, wherein the full-digital array transmits, as the first signal, a stream that should be transmitted with a reliability higher than a predetermined threshold, from among streams that should be transmitted by the radio communication device.

9. The radio communication device according to claim 1, wherein the radio communication device performs calibration of the full-digital array based on a second calibration signal transmitted from the second antenna element group of the hybrid beamformer, and then the radio communication device performs calibration of the hybrid beamformer based on a first calibration signal transmitted from the first antenna element group of the full-digital array.

* * * * *